(12) United States Patent
Lowes et al.

(10) Patent No.: US 6,276,158 B1
(45) Date of Patent: Aug. 21, 2001

(54) HEAT EXCHANGE EQUIPMENT

(75) Inventors: Albert Robert Lowes, Doven; Mark Steven Luxford, Kent, both of (GB)

(73) Assignee: Eaton-Williams Group Limited, Kent (GB)

( * ) Notice: Subject to any disclaimer, the term of this patent is extended or adjusted under 35 U.S.C. 154(b) by 0 days.

(21) Appl. No.: 09/357,757

(22) Filed: Jul. 21, 1999

(30) Foreign Application Priority Data

Jul. 23, 1998 (GB) .................................. 98159890
Nov. 24, 1998 (GB) .................................. 98256118

(51) Int. Cl.$^7$ .................................................. F25B 13/00
(52) U.S. Cl. .................... 62/324.5; 62/151; 62/324.6; 62/324.1
(58) Field of Search .................. 62/151, 324.6, 62/324.5, 324.1

(56) References Cited

U.S. PATENT DOCUMENTS

| | | | |
|---|---|---|---|
| 5,105,629 | * 4/1992 | Parris et al. | 62/278 |
| 5,771,699 | * 11/1998 | Ponder | 62/81 |
| 5,832,735 | * 11/1998 | Matsumoto et al. | 62/151 |
| 5,852,939 | * 12/1998 | Gazes | 62/260 |
| 6,021,644 | * 2/2000 | Ares et al. | 62/151 |
| 6,102,114 | * 8/2000 | Nishihara et al. | 165/207 |

* cited by examiner

*Primary Examiner*—William Doerrler
*Assistant Examiner*—Mark Shulman
(74) *Attorney, Agent, or Firm*—Clark & Brody

(57) ABSTRACT

Heat exchange equipment comprising a compressor which is connected to an indoor heat exchanger and also to two outdoor heat exchangers, and flow-direction changing means to change the direction of flow in the heat exchangers whereby each of the outdoor heat exchangers can be defrosted whilst the other continues to remove heat from its surroundings. Pressure lowering means are provided between the two outdoor heat exchangers. The flow-direction changing means are provided between the compressor and the heat exchangers and are controlled by control means to switch alternately between a first direction of flow of the heat exchange fluid, in which the latter passes from the indoor heat exchanger to one of the outdoor heat exchangers to defrost it, and thence to the other outdoor heat exchanger via the said pressure lowering means before it is returned to the compressor, so that the said other outdoor heat exchanger removes heat from its surroundings, and a second direction of flow of the heat exchange fluid, wherein the latter passes from the indoor heat exchanger to the said other outdoor heat exchanger to defrost it, and thence to the said one of the other outdoor heat exchangers via the said pressure lowering means, before it is returned to the compressor, so that the said one of the outdoor heat exchangers removes heat from its surroundings.

17 Claims, 1 Drawing Sheet

HEAT EXCHANGE EQUIPMENT

TECHNICAL FIELD

Figure 1:
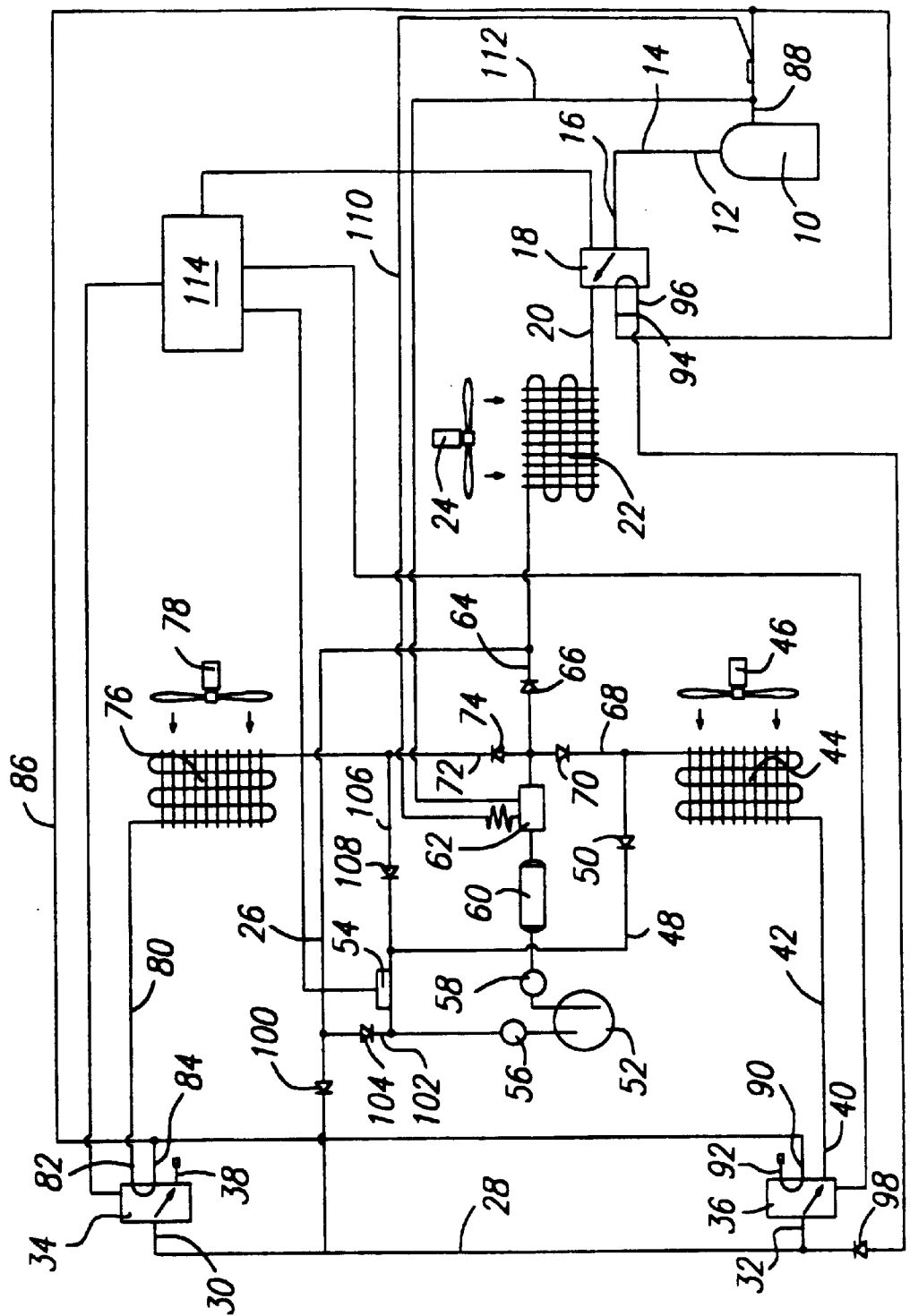

The present invention relates to heat exchange equipment comprising a compressor which is connected to a heat exchanger intended to be in contact with air for indoor circulation and also to two heat exchangers, both intended to be in contact with outdoor air, so that a heat exchange fluid can flow between the compressor and the heat exchangers, the equipment further comprising flow-direction changing means to change the direction of flow in the heat exchangers whereby each of the outdoor heat exchangers can be defrosted whilst the other continues to remove heat from its surroundings.

BACKGROUND OF THE INVENTION

Previously proposed such heat exchange equipment is disclosed in U.S. Pat. No. 5,771,699. This discloses an air conditioning system which employs reverse cycle refrigeration apparatus to condition air inside a building for heating in the winter months, and for cooling in the summer months, utilizing one heat exchanger coil disposed in heat exchange relation to the flow of conditioned air circulating within a building, and two heat exchanger coils disposed in heat exchange relation to the flow of ambient air circulating outside a building, wherein each heat exchanger coil comprises a separate and singular component part of a single air conditioning circuit connected to, and served by one single compressor; and wherein each of the outside heat exchanger coils are designed to change functions independently of the other, from that of an evaporator, to that of a condenser, for the purpose of inhibiting the accumulation of frost on, and/or removing frost from the outside heat exchanger coil when the heat pump is operating in the heating mode without reversing the flow of refrigerant within, or impeding the flow of refrigerant to the inside heat exchanger coil, whereby the inside heat exchanger coil will continue to function in the condenser mode, and will continue to furnish heat to the inside of a building during the defrost cycle of either of the said outside heat exchanger coils, and whereby heat generated by one said outside heat exchanger coil during the defrost cycle of that coil will be reabsorbed into the heat pump system via the other outside heat exchanger coil and circulated through the same refrigeration circuit, in a manner that will improve the efficiency of the heat pump.

Previously proposed equipment provides respective thermostatic control means for the outside coils. Furthermore, it is possible that both coils may require defrosting simultaneously.

SUMMARY OF THE INVENTION

The present invention seeks to obviate one or more of these disadvantages.

Accordingly, the present invention is directed to heat exchange equipment as set out in the opening paragraph of the present specification in which the equipment further comprises pressure lowering means between the two outdoor beat exchangers, and in which the fluid-direction changing means are provided between the compressor and the heat exchangers to enable a first direction of flow of the heat exchange fluid, wherein the latter passes from the indoor heat exchanger to one of the outdoor heat exchangers to defrost it, and thence to the other outdoor heat exchanger via the said pressure lowering means before it is returned to the compressor, so that the said other outdoor heat exchanger removes heat from its surroundings, and a second direction of flow of the heat exchange fluid, wherein the latter passes from the indoor heat exchanger to the said other outdoor heat exchanger to defrost it, and thence to the said one of the other outdoor heat exchangers via the said pressure lowering means, before it is returned to the compressor, so that the said one of the outdoor heat exchangers removes heat from its surroundings and in which the equipment further comprises control means connected so as to be able to issue control signals to the fluid-direction control valves to cause the latter to change the flow of the heat exchange fluid from one of the said first and second directions to the other.

The operation of the equipment as a heat pump to heat an indoor environment can alternate between a flow of the heat exchange fluid in the first direction and a flow of the heat exchange fluid in the second direction. Such flip-flop operation between the two directions of flow ensures that no more than one of the outdoor heat exchangers will need defrosting at any given time.

Preferably, the pressure lowering means comprises one pressure lowering device which serves both the outdoor heat exchangers, the flow direction changing means being such as to ensure that, for both the said first and second directions of flow of the heat exchange fluid, the latter passes through the said pressure lowering device in the same direction.

Preferably, the equipment further comprises defrost-threshold sensor means arranged to provide a signal indicative of when one or other of the outdoor heat exchangers requires defrosting, the control means being connected to receive signals from the defrost-threshold sensor means and to issue such a control signal upon receipt of a signal from the defrost-threshold sensor means.

One or more of the heat exchangers may comprise a coil, or a meandering passageway, for the flow of the heat exchange fluid.

The pressure lowering means may comprise a heat exchange fluid expansion device, which may simply be an orifice.

The heat exchange flow expansion device may comprise a thermostatic expansion valve. The latter may be adjustable to enable it to adjust the flow rate of fluid therethrough. Thus, if the expansion device comprises an orifice, the adjustability may be accomplished by adjusting the size of the orifice. Temperature-dependent control means may be incorporated in the adjustable expansion valve to adjust the latter in dependence upon the value of the temperature of the heat exchange fluid, preferably the heat exchange fluid flowing into the suction side of the compressor.

The defrost-threshold sensor means may be a temperature sensor. It may be located to provide an indication of the temperature of the heat exchange fluid where it flows between the two outdoor heat exchangers. In particular, the defrost-threshold sensor means may be located upstream of the pressure lowering means.

A fluid receiving vessel may be positioned upstream of the pressure lowering means. A fluid filter may be arranged between the fluid receiving vessel and the pressure lowering means to filter the heat exchange fluid which flows therebetween.

The heat exchange fluid may comprise a freon which may be a chlorofluoro hydrocarbon.

The compressor may comprise a positive displacement piston pump.

BRIEF DESCRIPTION OF THE DRAWING FIGURE

An example of heat exchange equipment made in accordance with the present invention is illustrated in the accompanying drawing, the only Figure of which shows a fluid circuit diagram of the equipment.

DETAILED DESCRIPTION OF THE PREFERRED EMBODIMENT

The equipment illustrated in the only accompanying Figure comprises a positive displacement piston pump compressor 10 having a discharge outlet 12 connected by a fluid conduit 14 to an inlet port 16 of a four-port reversing valve 18. In the setting shown in the Figure, the inlet port 16 is connected to the outlet port 20 of the reversing valve 18 which in turn is connected to an inlet of an indoor coil 22 provided with a fan 24, which, when operating, directs a flow of surrounding air over the outside surfaces of the coil 22. The outlet of the coil 22 is connected, via a fluid conduit 26 and a common gallery 28, to respective input ports 30 and 32 of two further four-port reversing valves 34 and 36. In the setting shown in the Figure, the input port 30 of the reversing valve 34 is connected to an output port 38 thereof which is closed.

The input port 32 of the reversing valve 36 on the other hand is connected to an output port 40 of the reversing valve 36 which is connected to a fluid conduit 42 leading to the input of a first outdoor coil 44. This is provided with its own fan 46. The outlet of the coil 44 is connected, via a fluid conduit 48 which includes a one-way valve 50 permitting fluid to flow through that conduit 48 in a direction away from the coil 44, but not in the opposite direction, to a liquid receiving vessel 52 where heat exchange fluid collects in liquid form. Fluid from the conduit 48 passes a temperature sensor 54, which is arranged to measure the temperature of the fluid, and a site glass 56. The fluid circuit continues downstream from the liquid receiving vessel 52 via a further site glass 58, a fluid filter 60 and a thermostatic expansion valve 62 which are connected in series with one another in that order following the fluid path downstream from the vessel 52. From the output of the thermostatic expansion valve, one conduit 64 passes via a non-return valve 66 to what at the moment has been described as the outlet from the coil 22, although with this setting of the reversible valves 18, 34 and 36, the pressure of fluid from the coil 22 closes the conduit 64 to fluid issuing from the thermostatic expansion valve 62.

A further fluid conduit 68 extends from the outlet of the thermostatic expansion valve 62 and is provided also with a non-return valve 70, which, in this setting of the reversible valves 18, 34 and 36, is closed to fluid issuing from the thermostatic expansion valve 62 in view of the pressure of fluid issuing from the coil 44.

A further conduit 72 provided with its own non-return valve 74 receives low pressure heat exchange fluid from the thermostatic expansion valve 62 and enables the latter to flow to an inlet of a surrounding outdoor coil 76 provided with its own fan 78. From the outlet of the coil 76, the fluid flows along a further fluid conduit 80, and then via ports 82 and 84 of the reversing valve 34 to a return line 86 which is connected to the suction inlet port 88 of the compressor 10.

The return line 86 is also connected to a port 90 of the return valve 36, which port 90 is, in the setting of the reversing valve 36 shown in the Figure, connected to a port 92 of that reversing valve which is closed.

The return line 86 is also connected to a port 94 of the reversing valve 18 which port 94 is, in the illustrated setting of the valve 18, connected to another port 96 thereof, which in turn is connected to the common gallery 28 via a non-return valve 98. The non-return valve 98 inhibits any flow of fluid from the common gallery 28 to the return valve 18.

A non-return valve 100 is arranged in the flow conduit 26 to enable fluid to flow through that conduit 26 to the common gallery 28, but not in the other direction.

A further flow conduit 102 connects the flow conduit 26 to the vessel 52 via a non-return valve 104 which enables fluid to flow in that direction, but not in the other.

A further flow conduit 106 connects what is the input to the coil 76 in the illustrated setting to the temperature sensor 54 via a non-return valve 108 which enables fluid to flow in that direction, but not in the other.

Lines 110 and 112 extend between the thermostatic expansion valve 62 and the suction inlet 88 of the compressor 10 to enable the thermostatic expansion valve to be adjusted in dependence upon the temperature and pressure respectively of fluid flowing into that inlet 88.

With the reversing valves 18, 34 and 36 set in the illustrated manner, with a freon as the heat exchange fluid filling the passageways and cavities of the illustrated equipment and with the compressor 10 operating, hot high pressure gaseous freon passes from the compressor through the coil 22 where the freon condenses and heat is exchanged from the freon into the indoor air with the fan 24 operating to assist this heat exchange. The freon continues its passage through the conduit 26 to the common gallery 28, then on through the reversing valve 36 (the reversing valve 34 being closed to the refrigerant at this stage) and on to the outdoor coil 44. The freon is still at relatively high pressure at this stage and is in warm liquid form. The fan 46 is switched off, and the outdoor coil 44 is therefore being defrosted at this stage. That is to say, heat is being given out from the heat exchange fluid in this mode of operation of the equipment at coil 44. Because the freon is in liquid form rather than in hot gas form, it does not transfer heat so rapidly to the ice on the outside of the coil 44. In conventional equipment, where the heat exchange fluid is in hot gas form for defrosting a coil, the ice melts so quickly where it contacts the coil that a void is formed between the coil and the rest of the ice. With the illustrated equipment, in which freon in warm liquid form is used for defrosting, no such void is created, or any such void is much smaller, and the overall defrosting time is reduced.

The freon continues via the conduit 48 past the temperature sensor 54 into the vessel 52 and thence via the filter 60 and the thermostatic expansion valve 62 into the conduit 72. At the thermostatic expansion valve 62, the pressure of the freon falls so that when it reaches the coil 76, it evaporates, thus receiving heat from the surrounding air. The fan 78 is operated to assist this heat exchange. The outdoor coil 76 thereby removes heat from its surroundings in this mode of operation of the equipment, and the freon in it evaporates and becomes superheated. The freon continues via the reversing valve 34 to the return line 86 and thence to the suction intake 88 of the compressor 10 where it recommences the cycle of flow into the conduit 14 from the discharge outlet 12 of the compressor 10.

When the temperature sensed by the sensor 54 falls below a predetermined threshold value, indicating that the outdoor coil 76 requires defrosting, the direction of flow of the freon is altered.

This is achieved by means of an electrical connection from the temperature sensor 54 to control means 114 which has outputs to the respective operating solenoids of the reversing valves 18, 34 and 36.

Thus, when the temperature of the freon passing the temperature sensor 54 falls below a given threshold value, that is detected by the sensor 54, so that the control means 114 issues signals to switch the reversing valves 34 and 36.

In the switched condition, the input 30 of reversing valve 34 is connected to the port 82, and the ports 38 and 84 of the reversing valve 34 are connected to one another.

Correspondingly, the input 32 of the reversing valve 36 is connected to the closed port 92 and the ports 90 and 40 are connected together.

In this switched condition of the equipment, freon which exits the coil 22 into the conduit 26 is now unable to pass through the reversing valve 36 and instead passes from the common gallery 28 via the valve 34 to the conduit 80. What was the output from the coil 76 now becomes its input. The freon therefore passes first through the outdoor coil 76, the fan 78 of which is now switched off, to defrost that coil, and then passes on via the conduit 106 past the temperature sensor 54 into the vessel 52. From there, it flows through the filter 60 and the thermostatic expansion valve 62 where its pressure falls. It now passes via the conduit 68 into what was the output from the coil 44 but is now the input thereto, through that coil, the fan 46 of which is now in the operative condition, and out through what was the input of the coil but is now the output thereof, to the conduit 42. It then passes via the ports 40 and 90 of the reversing valve 36 to the return pipe 80 and thence to the suction input 88 of the compressor 10. Thus, operation of the coils 44 and 76 is reversed, so that now the coil 76 is defrosted and the coil 44 removes heat from the surroundings. This is the heat that is then subsequently transferred from the coil 22 to the indoor surroundings in the next cycle of flow of the freon.

Once the temperature sensor 54 detects a further fall of the temperature through a given threshold indicative of a need for the coil 44 to be defrosted, the control means 114 switches the reversing valves 34 and 36 back to the illustrated condition so that the flow of the freon reverts back to the path it had at the outset of this description of the illustrated equipment.

In this way, the direction of flow of the freon alternates between the direction it has with the valves 34 and 36 in the illustrated condition to the direction it has with the other setting already described herein for those valves. This flip-flop operation of the equipment continues so that there is a continual, efficient and consistent supply of heat indoors without any down time for defrosting. This operation also ensures that the two coils 76 and 44 at no stage require simultaneous defrosting.

It will be appreciated that this equipment can also operate as an air conditioner to cool the indoors when the reversing valve 18 is switched to connect the port 16 to the port 96, and to connect the port 20 to the port 94. At the same time, the reversing valve 34 would be switched to have the port 30 connected to the port 82, with the ports 34 and 84 connected with one another. Lastly, the reversing valve 36 would be in the condition illustrated. As a result, freon exits the compressor 10 through its discharge outlet 12 as a hot gas, passes through the port 96 of the valve 18 and the non-return valve 98 to the common gallery 28. It then passes through both coils 44 and 76, so that both act as condensers, and then on, via the thermostatic expansion valve 62 and preceding devices (52 to 60) to the indoor coil 22 which acts as an evaporator to cool the inside air. All the fans 24, 44 and 76 are switched on during this mode of operation of the equipment. The superheated freon passes on to the suction input 88 of the compressor 10 via the port 94 of the valve 1B, then out of the outlet 12 and so on.

It will also be appreciated that the lines 110 and 112 enable the thermostatic expansion valve 62 to be adjusted to maintain the desired level of heating effect at the indoor coil 22 when the equipment is operating as a heat pump and ensures that the coil 22 provides the desired amount of cooling of the indoor air when the equipment is operating as an air conditioner. It also operates in conventional manner to ensure that whichever coil is acting as an evaporator, substantially the whole of the length of the coil is used for evaporation, and substantially no liquid flows from it.

Numerous variations and modifications to the illustrated equipment will occur to the reader without taking the resulting construction outside the scope of the present invention For example, in one simplified form of construction, the thermostatic expansion valve might be non-adjustable, avoiding the need for the lines 110 and 112, although clearly less control will be available by such a construction The filter 60 may also comprise a drier.

Because the freon is a warm liquid rather than a hot gas when it enters the first outdoor coil with the equipment in heat pump mode, a sub-cooling effect is achieved, reducing the evaporator temperature, increasing delta-t with the outside air and resulting in efficient defrosting and simultaneous heating of the indoor air The need for power supply cabling is reduced with the illustrated equipment, and the need for electric back-up heating is obviated when the equipment is operating in heat pump mode.

Power consumption is reduced in that most of the heat generated by the compressor is transferred to the indoor environment when the equipment operates as a heat pump, rather than to the outdoor environment as with conventional equipment in which defrosting cycles are frequent.

The efficiency of the cooling mode of operation of the equipment is not affected by the construction of the equipment for its heat pump mode.

The illustrated reversing valve configuration ensures, in all modes, that the pressure differential is conducive to maximum sealing of each reversing valve through good seating of its shuttle.

We claim:

1. Heat exchange equipment comprising a heat exchanger intended to be in contact with air for indoor circulation, two heat exchangers both intended to be in contact with outdoor air, and a compressor connected to the indoor heat exchanger and to both outdoor heat exchangers so that a heat exchange fluid can flow between the compressor and the heat exchangers, the equipment further comprising flow-direction changing means to change the direction of flow in the heat exchangers whereby each of the outdoor heat exchangers can be defrosted whilst the other continues to remove heat from its surroundings, in which the equipment further comprises pressure lowering means between the two outdoor heat exchangers, and in which the fluid-direction changing means are provided between the compressor and the heat exchangers to enable a first direction of flow of the heat exchange fluid, wherein the latter passes from the indoor heat exchanger to one of the outdoor heat exchangers to defrost it, and thence to the other outdoor heat exchanger via the said pressure lowering means before it is returned to the compressor, so that the said other outdoor heat exchanger removes heat from its surroundings, and a second direction of flow of the heat exchange fluid, wherein the latter passes from the indoor heat exchanger to the said other outdoor heat exchanger to defrost it, and thence to the said one of the outdoor heat exchangers via the said pressure lowering means, before it is returned to the compressor, so that the said one of the outdoor heat exchangers removes heat from its surroundings, and in which the equipment further comprises control means connected so as to be able to issue control signals to the fluid-direction changing means to cause the latter to change the flow of the heat exchange fluid from one of the said first and second directions to the other, and further wherein the pressure lowering means comprises one pressure lowering device which serves both the outdoor heat exchangers, the flow direction changing means being such as to ensure that, for both the said first and second directions of flow of the heat exchange fluid, the latter passes through the said pressure lowering device in the same direction.

2. Heat exchange equipment according to claim 1, in which the equipment further comprises defrost-threshold sensor means arranged to provide a signal indicative of when one or other of the outdoor heat exchangers requires defrosting, the control means being connected to receive signals from the defrost-threshold sensor means and to issue such a control signal upon receipt of a signal from the defrost-threshold sensor means.

3. Heat exchange equipment according to claim 1, in which one or more of the heat exchangers comprises a coil, or a meandering passageway, for the flow of the heat exchange fluid.

4. Heat exchange equipment according to claim 1, in which the pressure lowering means comprises a heat exchange fluid expansion device.

5. Heat exchange equipment according to claim 4, in which the expansion device comprises an orifice.

6. Heat exchange equipment according to claim 4, in which the heat exchange flow expansion device comprises a thermostatic expansion valve.

7. Heat exchange equipment according to claim 6, in which the thermostatic expansion valve is adjustable to enable it to adjust the flow rate of fluid therethrough.

8. Heat exchange equipment according to claim 7, in which temperature-dependent control means are incorporated in the adjustable expansion valve to adjust the latter in dependence upon the value of the temperature of the heat exchange fluid.

9. Heat exchange equipment according to claim 8, in which the temperature-dependent control means adjust the expansion valve in dependence upon the value of the temperature of the heat exchange fluid flowing into the suction side of the compressor.

10. Heat exchange equipment according to claim 2, in which the defrost-threshold sensor means comprises a temperature sensor.

11. Heat exchange equipment according to claim 10, in which the temperature sensor is located to provide an indication of the temperature of the heat exchange fluid where it flows between the two outdoor heat exchangers.

12. Heat exchange equipment according to claim 11, in which the said temperature sensor is located upstream of the pressure lowering means.

13. Heat exchange equipment according to claim 1, in which a fluid receiving vessel is positioned upstream of the pressure lowering means.

14. Heat exchange equipment according to claim 13, in which a fluid filter is arranged between the fluid receiving vessel and the pressure lowering means to filter the heat exchange fluid which flows therebetween.

15. Heat exchange equipment according to claim 1, in which the heat exchange fluid comprises a freon.

16. Heat exchange equipment according to claim 15, in which the heat exchange fluid is a chlorofluoro hydrocarbon.

17. Heat exchange equipment according to claim 1, in which the compressor comprises a positive displacement piston pump.

* * * * *